UNITED STATES PATENT OFFICE.

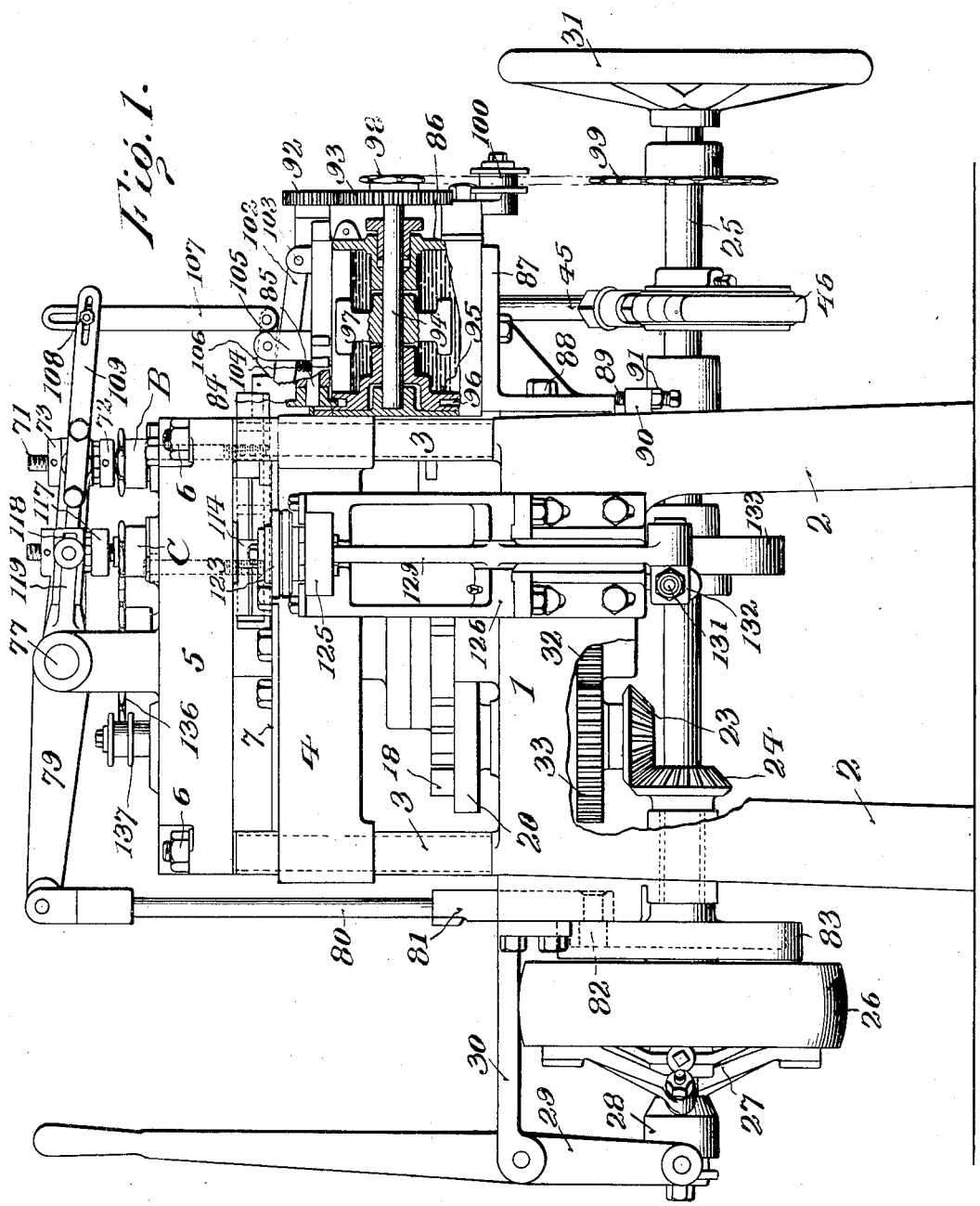

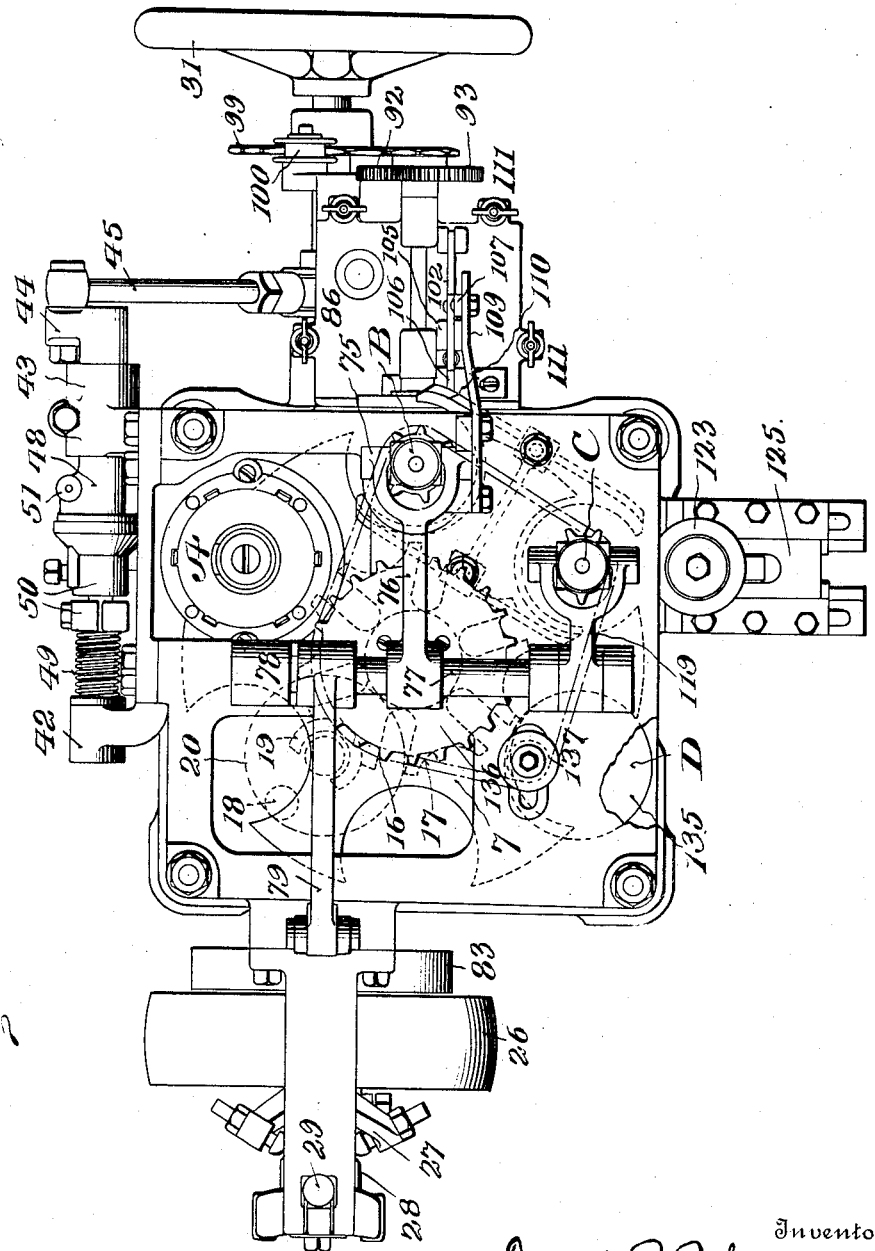

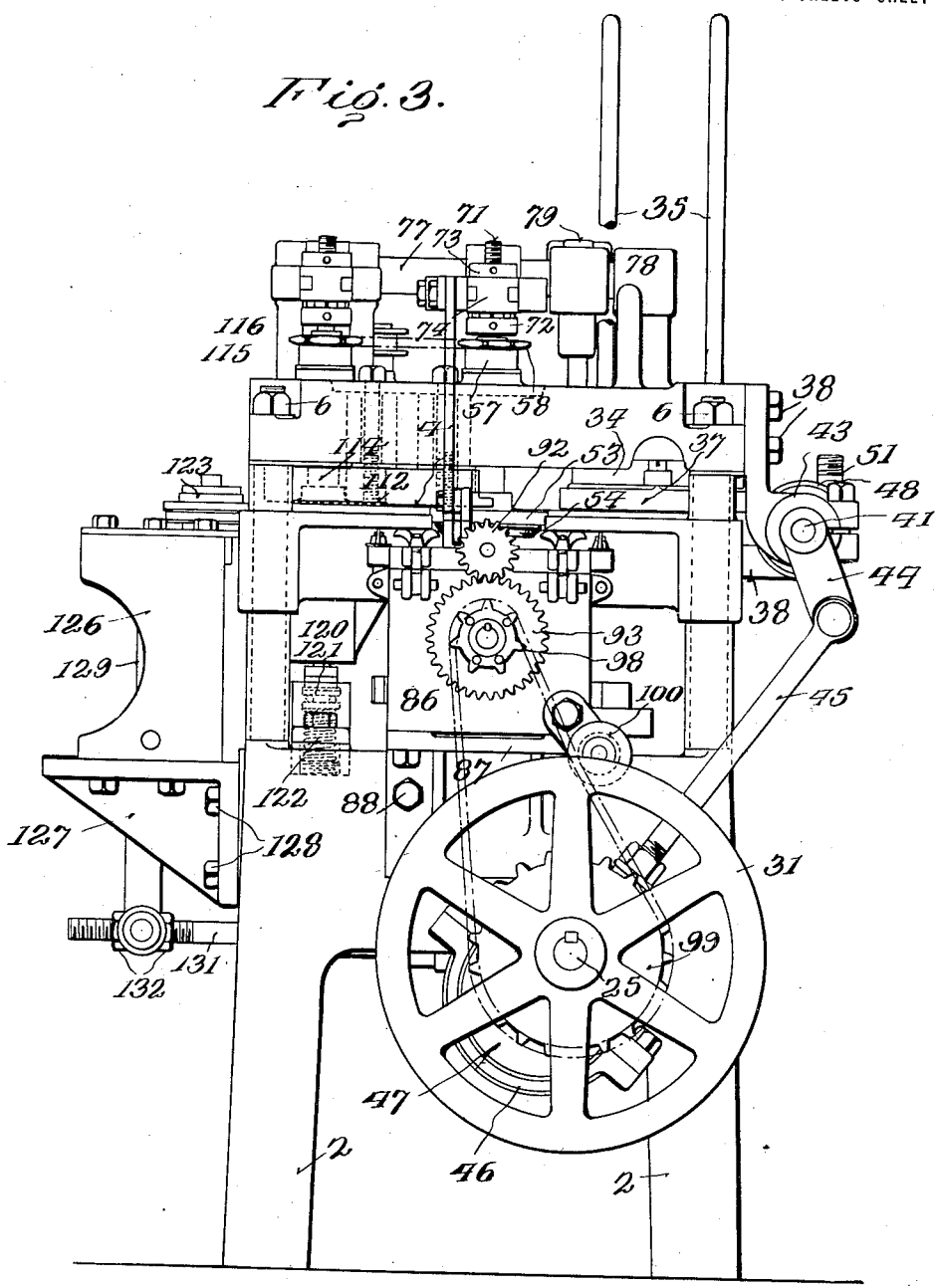

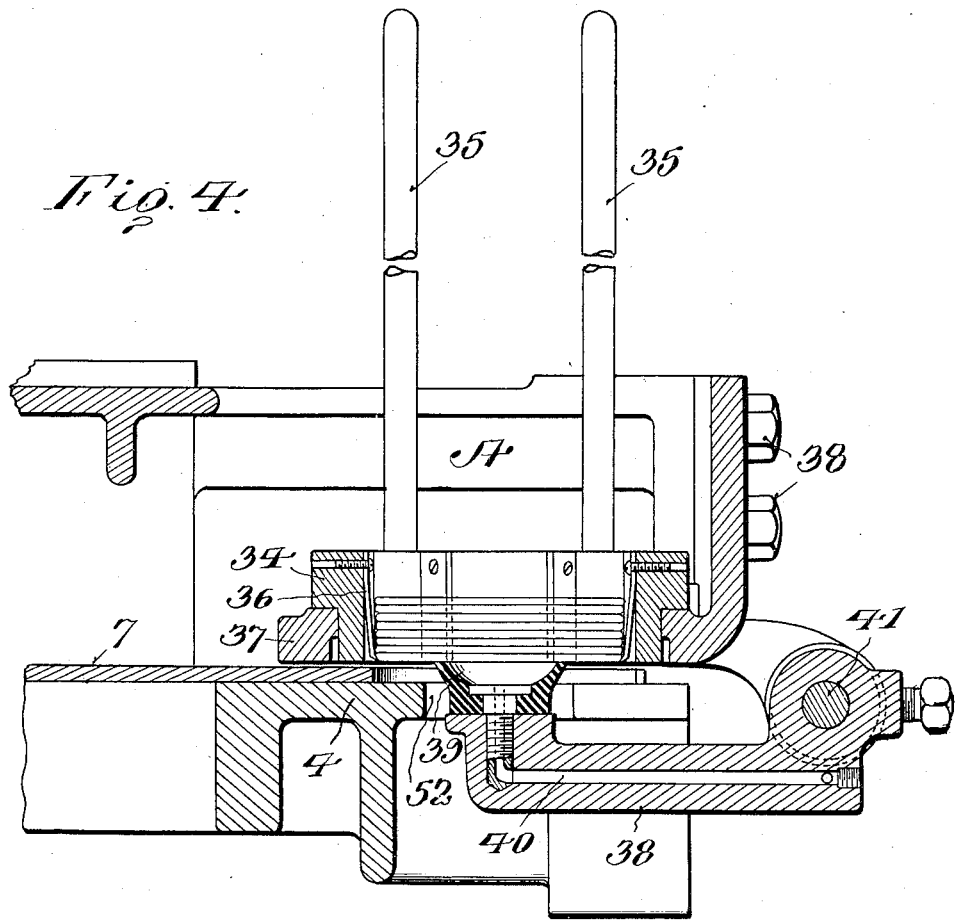
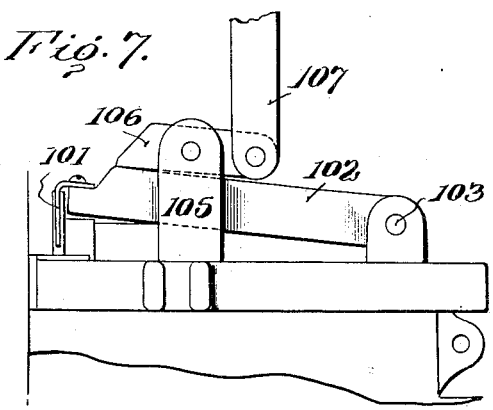
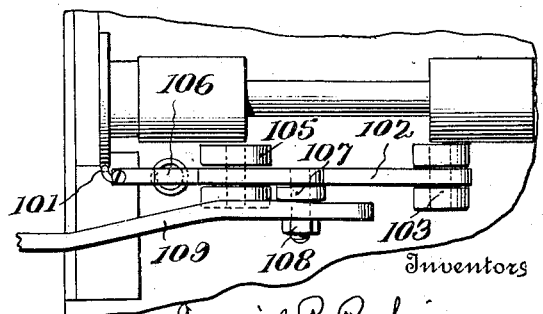

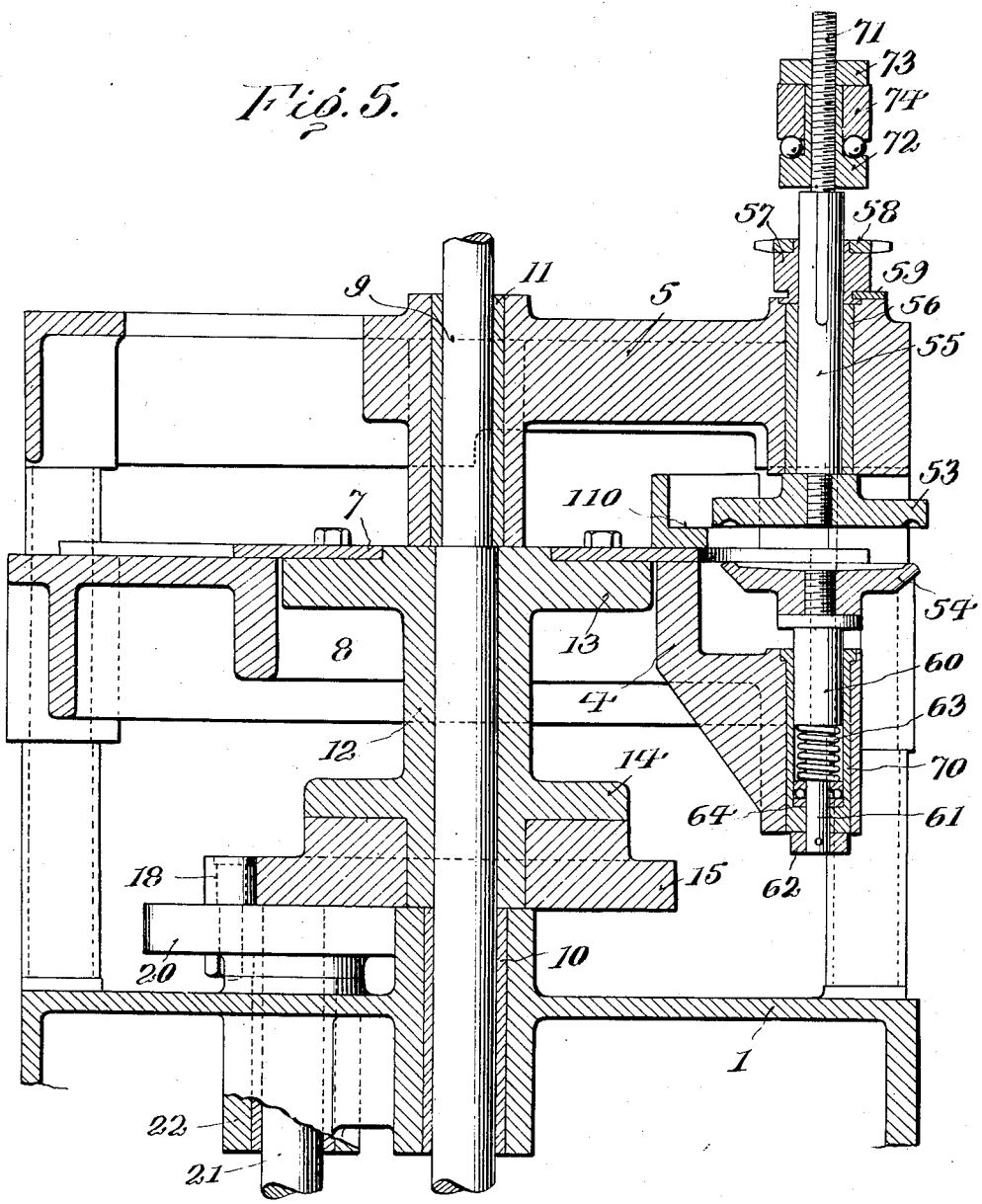

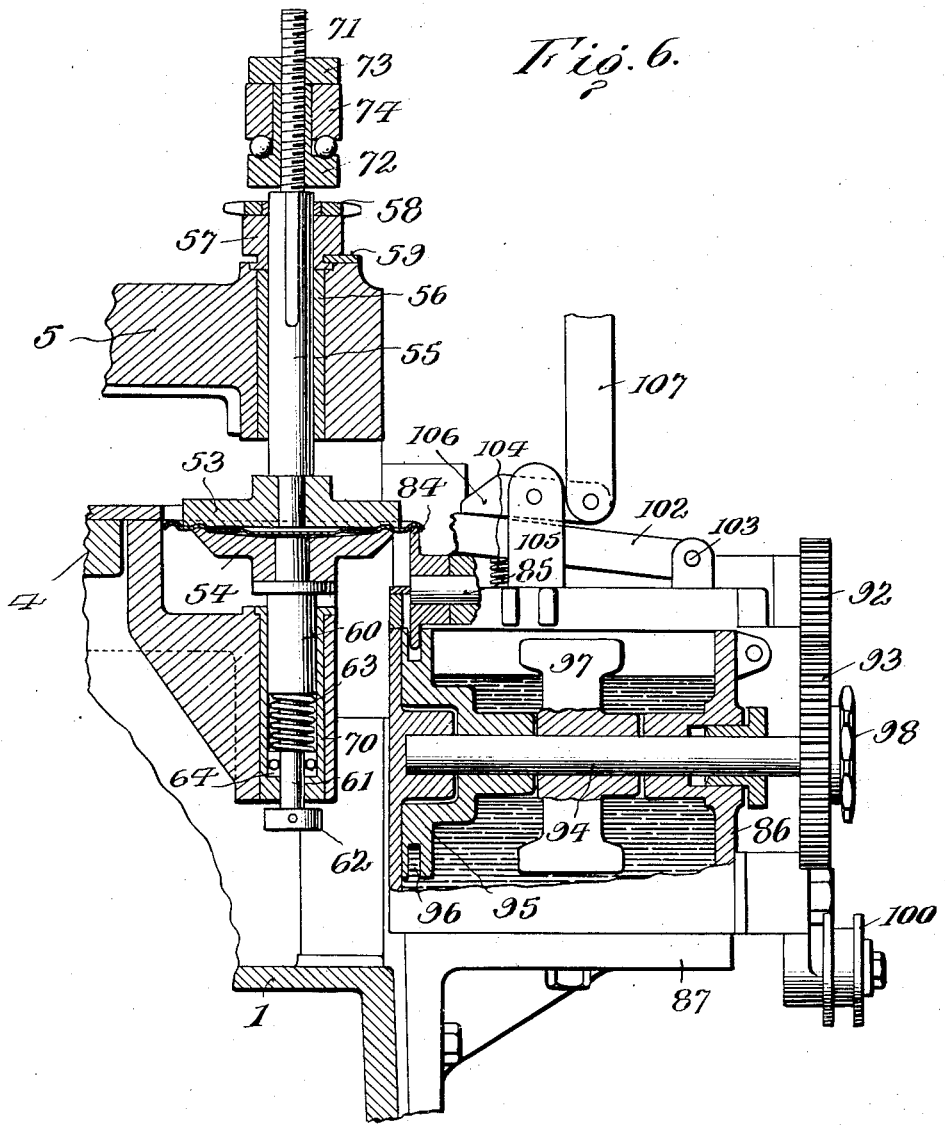

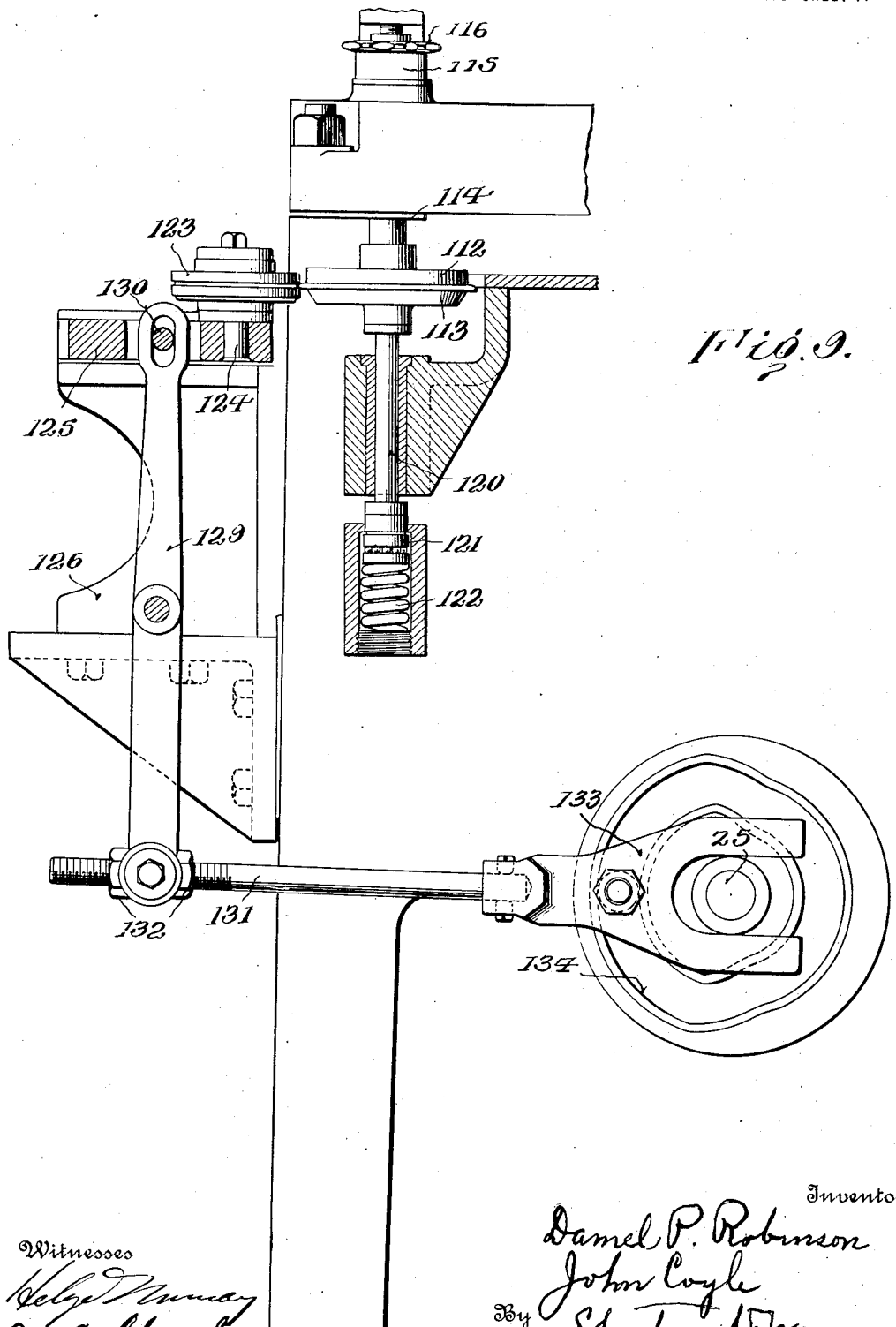

DANIEL P. ROBINSON AND JOHN COYLE, OF BALTIMORE, MARYLAND, ASSIGNORS TO CONTINENTAL CAN COMPANY, INCORPORATED, OF SYRACUSE, NEW YORK, A CORPORATION OF NEW JERSEY.

END COATING AND CURLING MACHINE.

1,172,049.     Specification of Letters Patent.     Patented Feb. 15, 1916.

Application filed July 18, 1914.   Serial No. 851,780.

*To all whom it may concern:*

Be it known that we, DANIEL P. ROBINSON and JOHN COYLE, citizens of the United States, residing at Baltimore, in the State of Maryland, have invented certain new and useful Improvements in End Coating and Curling Machines, of which the following is a description, reference being had to the accompanying drawing and to the figures of reference marked thereon.

The invention relates to new and useful improvements in machines for coating and curling can ends and more particularly to a coating machine wherein a plastic sealing composition is coated on the end by a coating roll.

An object of the invention is to provide an end coating machine wherein the ends to be coated are fed between chucks rotating about a fixed axis, which chucks may be given an endwise movement relative to each other for clamping the can end and rotating the same as it is coated.

A further object of the invention is to provide a device of the above character with an intermittently rotating feeding device which operates to place the can end between the chucks when separated, to dwell while the can end is being chucked, rotated and coated, and which is again rotated for removing the can end after the chucks are separated.

A still further object of the invention is to provide a coating device of the above character wherein the can ends are slid along a supporting table or plate as they are carried to the coating station, above which plate or table is placed a stack holder for the stacked can ends, and means is provided for intermittently feeding the ends from the stack on to the supporting table or plate into proper engagement with the feeding device which conveys the ends to the chucks.

A still further object of the invention is to provide a curling station to which the can ends are conveyed after they are coated, where the edge of the can end may be curled to protect the coating, and prepared for rolling into a double seam.

A still further object of the invention is to provide an intermittently operating end coating machine in which the ends are fed from a stack to an intermittently rotating device which conveys the ends to a coating station and thence to a curling station and finally to a discharge station.

These and other objects will in part be obvious and will in part be hereinafter more fully disclosed.

In the drawings which show by way of illustration one embodiment of the invention: Figure 1 is a view partly in side elevation and partly in section showing an end coating machine embodying the invention. Fig. 2 is a plan view of the same. Fig. 3 is an end view of the same. Fig. 4 is a detail in section showing the stack holder, the supporting table or plate, the feeding device, and the means for withdrawing the can ends one at a time from the stack holder. Fig. 5 is a detail in vertical section showing the central rotating shaft, the feeding member and the chucks at the coating station. Fig. 6 is a detail in vertical section showing the coating roll, the means for supplying the coating material thereto, the chucks for rotating the can end, and the can end clamped by the chucks and engaging said coating roll. Fig. 7 is a detail showing in side elevation the cleaning needle and the operating mechanism therefor, which keeps the opening clear for the coating roll. Fig. 8 is a plan view of the same. Fig. 9 is a detail in vertical section showing the chucks at the curling station, the curling roll and the operating mechanism therefor.

The end coating machine consists generally in a supporting frame on which is mounted a supporting table and above this table and spaced therefrom is a cap plate. Suitably mounted on the cap plate is a stack holder for the stacked can ends. These can ends are fed one at a time from the stack holder on to the supporting table through the aid of a swinging arm carrying a suction cup. Suitably mounted in the cap plate and in the main frame is a pair of chucks which rotate about a fixed vertical axis. The upper chuck is positively rotated and is capable of endwise movement so as to clamp a can end against the lower chuck and rotate the same. Associated with this pair of chucks is a coating roll which is mounted on a shaft rotating in fixed bearings. After the end is clamped between the chucks, both chucks are lowered to bring the can end into engagement with the coating roll. Also mounted in the cap plate and in the frame is a second pair of chucks, similar in construction and operation to the chucks above described. Associated with this second pair of chucks is a curling roll which is moved by suitable mechanism into contact with the edge of the can end for curling the same to protect the coating applied thereto. The can ends are fed from the stack along the supporting table and between the first pair of chucks when separated by an intermittently rotated feeding disk having segmental pockets therein which receive the can end. The can ends are fed from the stack holder between the first pair of chucks, after which the feeding disk dwells until the chucks have engaged the can end, rotated the same in contact with the coating roll, and separated to release the can end, after which it is again moved to carry the can end to the curling station where it is given a second dwell while the end is being curled. After the curling operation is finished, the feeding disk is again moved to carry the end to the discharge station.

Referring more in detail to the drawings, in Fig. 2 I have shown a plan view of the end coating machine. The feeding in station is indicated at A; the coating station at B; the curling station at C, and the discharge station at D. The machine consists of a main supporting frame 1 which is mounted on suitable legs 2—2. Rising from the main frame are columns 3—3 which support the table 4. These columns project through the table 4 and also support a cap plate 5. The columns are threaded at the upper ends to receive nuts 6 which clamp the table and the cap plate rigidly in spaced relation to each other on the main frame 1. The can ends are fed on to this supporting table 4 and are slid along the same first to the coating station B, thence to the curling station C, and finally to the discharge station D by a rotating disk 7.

As shown in Fig. 5 of the drawings, the table 5 is cut away centrally as indicated at 8. A shaft 9 is journaled in a suitable bearing 10 in the main frame 1 and also in a spindle bearing 11 in the cap plate 5. This shaft carries a sleeve 12 which is loosely mounted thereon and is provided with a radially projecting flange 13 to which the feeding disk 7 is bolted. The sleeve 12 carries a second flange 14 to which is bolted the star wheel 15 of a Geneva stop motion. This star wheel 15 is provided with radial grooves 16 and segmental pockets 17 which are adapted to be engaged by a roller 18 and stop flange 19, respectively, mounted on a rotating disk 20. The rotating disk 20 is carried by the shaft 21 which is journaled in a suitable bearing 22 carried by the main frame 1. A rotation of the disk 20 gives an intermittent rotation to the sleeve 12 in the manner well understood in this type of movement and locks the sleeve against movement when at a dwell. The shaft 21 carries a beveled gear 23 at the lower end thereof which meshes with a beveled gear 24 on the main shaft 25 which is journaled in suitable bearings in the main supporting frame. This shaft 25 has loosely mounted thereon a belt wheel 26 which may be clutched to the shaft 25 through a suitable friction clutch mechanism 27 controlled by a cone sleeve 28 and a wheel 29 which is pivoted to a bracket 30 carried by the main frame. The shifting of this hand lever moves the cone sleeve and causes the friction clutch to either grip or release the belt wheel 26. At the other end of the main shaft 25 is a hand wheel 31 through which the shaft may be turned over when released from its driving mechanism. The shaft 9 is provided with a gear wheel 32 which meshes with a gear wheel 33 carried by the shaft 21 and through these gear wheels a continuous rotation is imparted to the shaft 9.

The feeding in station indicated at A consists of a stack holder ring 34 which is provided with rods 35 between which the ends are stacked. At the lower end of the ring 34 are retaining clips 36 on which the stack rests. This ring 34 is mounted in a bracket 37 which is bolted by suitable bolts 38—38 to the cap plate 5 of the machine. The bracket 37 is spaced above the supporting table 4 and the feeding disk 7 rotates between this suspended bracket 37 and the table 4. The ends are withdrawn one by one from the retaining clips by a swinging arm 38 which is provided with a rubber suction cup 39. This arm is formed with a passage 40 which is connected to the inner chamber of the cup. The arm 38 is clamped to a shaft 41. This shaft is mounted in bearings 42 and 43 carried by the cap plate 5 of the machine. This shaft 41 extends beyond the bearing 43 and carries an arm 44 which is clamped thereto. A pitman 45 of an eccentric strap 46 engages the arm 45 and oscillates the same. This strap coöperates with an eccentric 47 on the main shaft 25. Mounted on the shaft 41 and held from rotation relative thereto is a sleeve 48. This sleeve is faced at the end thereof adjacent the arm 38 and the sleeve supporting the arm is correspondingly faced. A spring 49 bears at one end against a collar 50 fixed to the shaft 41 and at the other end against the bearing 42 for the shaft. This spring normally presses the faced surfaces of the supporting sleeve for the arm 38 and the sleeve 48 into contact with each other so as to make a substantially air tight joint. The sleeve 49 is provided with a port 51 to which a vacuum tube is attached. Suitable passages lead from this port 51 to the passage 40 in the arm 38. These passages are brought into and out of register, and means is provided for breaking the vacuum in a manner well known in this art. As the arm 38 oscillates the suction cup will engage the lowermost end of the stack and at this time the passage 40 is connected with the port 51 so that the cup is under suction. A downward movement of the arm will strip the lowermost end from the retaining fingers and bring the same down on to the table 4 into one of the receiving pockets of the feeding disk 7. The passage 40 is disconnected from the port 51 as the arm 38 swings and the vacuum is broken so as to release the suction cup from the can end. The table 4 is cut away at 52, see Fig. 4, to permit this suction cup to move into engagement with the can end, but this cut away portion 52 is of considerably less diameter than the diameter of the can end so that the can end will rest on the table 4 and be stripped from the suction cup as the arm 38 swings downward. The feeding disk 7 is intermittently rotated as above noted and after the can end has been placed on the table, and while the suction cup is below the table said disk is rotated to convey the can end to the coating station indicated at B.

The coating station comprises an upper chuck 53 and a lower chuck 54. The upper chuck is carried by a rotatable spindle 55. This spindle is mounted in a suitable bearing 56 in the cap plate 5 and is free to slide endwise in the bearing. Splined to the spindle 56 is a collar 57 to which is attached a sprocket wheel 58. This collar 57 has a groove formed therein in which is placed a plate 59 which holds the collar from endwise movement relative to the cap plate 5 but permits the collar to rotate freely when the sprocket wheel is rotated. This collar serves to rotate the spindle 55 and through the spindle the chuck 53 is supported thereby. The chuck 54 has its upper face when raised substantially flush with the upper face of the table 4. This chuck is mounted on a supporting stem 60 which is journaled in a bearing 70 formed in a bracket or flange depending from the table 4.

The lower end of the bearing is partly closed and the stem 60 has a reduced section 61 which extends through the end of the bearing. A collar 62, attached to the lower end of the stem, limits the upward movement thereof. The spring 63 engages the lower part of the enlarged portion of the stem and rests on a ball bearing 64. This provides a supporting bearing for the chuck 54 which permits the chuck to rotate freely and also permits the chuck to be depressed or lowered. The faces of the chucks 53 and 54 are preferably shaped so as to form a proper clamping seat for the can end.

At the upper end, the spindle 55 is reduced and threaded as at 71. A sleeve 72 is threaded on to this threaded section of the spindle and a lock nut 73 will hold the same in adjusted positions. Also mounted on the sleeve 72 is a collar 74. This collar carries projecting arms which are engaged by the forked end 74 of an arm 76 fixed to a shaft 77, which in turn is mounted to oscillate in supporting bearings 78 projecting upwardly from the cap plate 5. The shaft 77 is oscillated by an arm 79 which is fixed to the shaft and which is connected at its outer end to a rod 80. The rod 80 is fixed to a slide member 81 which carries a roller 82 running in a cam groove in a disk 83 mounted on the main shaft 25. This cam groove is so shaped as to raise the arm 79, after which a dwell is given to the movement of the arm, then the arm is lowered and a relatively long dwell given thereto. This movement imparted to the shaft 77 will swing the arm 76 and raise and lower the chuck spindle 55.

When the parts are in the position shown in Fig. 5, the chuck 53 is at its extreme upper position and is at a dwell. At this time the feeding disk 7 is given one step in its movement which brings the can end between the chucks, after which the disk dwells, and the chuck 53 is moved downwardly until the can end is clamped on to the lower chuck 54, after which both chucks have a further downward movement to bring the can end into contact with the coating roll. During all this time the chuck 53 is rotating and as soon as the can end is clamped or engaged thereby the lower chuck and can end will be caused to rotate with the upper chuck. Associated with the chucks 53 and 54 is a coating roll 84. This coating roll 84 is mounted on a shaft 85 which is journaled in suitable bearings attached to the tank 86 for the coating material. The tank 86 is bolted to a bracket 87 which in turn is secured by bolts 88 to the main frame. These bolts pass through slots and the bracket may be adjusted and held in adjusted position through the aid of stop screws 89 which are threaded into lugs 90 and held in adjusted position by lock nuts 91.

On the outer end of the shaft 85 is a gear 92 which meshes with a gear wheel 93 on a shaft 94 journaled in bearings carried by the tank and extending through the tank. Fixed to the shaft 94 is a handing up roll 95 which is provided with a groove 96 in which runs the coating roll 84. This handing up roll extends close to the bottom of the tank and will always rotate in the coating material. The groove in the handing up roll becomes charged with the plastic coating material and the coating roll 84 running in this groove is charged with a coating for the can end. Also mounted on the shaft 94 are stirring arms 97 which keep the plastic material constantly stirred. The shaft 94 carries a sprocket wheel 98 and a sprocket chain connects this sprocket wheel with a sprocket wheel 99 on the main shaft 25. An idler 100 coöperates with said sprocket chain.

The coating roll extends through a slot in the top of a tank. In order that this slot may be kept open and not become clogged with the coating material, I have provided a cleaning needle 101. This cleaning needle is carried by an arm 102 which is pivoted at 103 to the top plate of the tank and the needle is so positioned that as the arm moves up and down, it will move into the opening adjacent the coating wheel and keep the opening clear. This arm is held raised by a spring 104. The arm moves up and down between guiding brackets 105. Pivoted to these guiding brackets is a latch 106. A link 107 is pivoted to the latch. The upper end of the link is slotted and carries an adjustable bolt 108. Mounted on the arm 76 is a fixed projecting arm 109 and this arm 109 is connected to the bolt 108. As the arm 76 is raised, the arm 109 which is, in effect, an extension of the same, will through the link 107 swing the latch 106 and depress the pivoted arm 102, forcing the needle down into the slot or opening adjacent the coating roll. A movement of the arm 76 in the opposite direction permits the needle to be raised through the action of the spring 104.

The coating roll is positioned so that the upper edge thereof is normally slightly below the upper face of the lower chuck 54. This permits the can end to be fed freely over the top of the chuck 53 without striking the coating roll. After the chucks have clamped the can ends, both chucks are moved downward as above noted, and this brings the groove in the under face of the can end into contact with the coating roll so that as the chucks rotate the entire surface of the can end groove will be coated. When the upper chuck is released the spring 63 will raise the lower chuck, lifting the can end off the coating roll and bring the same to a proper level so that the next step movement of the feeding disk 7 will convey the can end to the curling station.

In order to prevent the can end from sticking to the upper chuck and being lifted with the same, I have provided a stripper plate. This stripper plate is indicated at 110 in Fig. 2. The stripper plate is secured to the under face of the cap plate 5 by suitable bolts 111. This stripper plate extends downward so that its lower face is just above the upper face of the feed disk 7. The end of the stripper adjacent the coating station is shaped to conform to the chuck and is slightly larger than the chuck so as to permit the same to move vertical freely in this end space of the stripper plate. The stripper plate, however, overlaps slightly the segmental pocket in the feed disk and also overlaps the edge of the can end so that if the can end sticks to the upper chuck it will engage the stripper plate which will force it off from the chuck. After the can end is coated, it is then moved to the curling station, indicated in Fig. 2 at C. This curling station comprises two chucks 112 and 113. The chuck 112 is carried by a spindle 114 mounted in suitable bearings in the cap plate 5. This spindle 114 is splined to a collar 115 which carries a sprocket wheel 116 and the collar and the sprocket wheel are held from endwise movement in the same manner as described in connection with the driving means for the chuck spindle at the coating station. This spindle 114 is also raised and lowered by a means similar to that described in connection with the chuck spindle 55.

At the upper end of the spindle 114 is an adjustable sleeve 117 which carries a collar 118 having a connection with the forked end of an arm 119. This arm 119 is fixed to the shaft 77. The lower chuck 113 is carried by a stem 120 which is mounted in the depending flange of the supporting table 4. The stem rests on a ball bearing 121 and is held raised by a spring 122. The curling roll is indicated at 123, see Fig. 9. This curling roll is mounted on a stub shaft 124 carried by a slide 125 mounted to reciprocate in a housing 126 which is bolted to a bracket 127, and the bracket in turn is bolted to the main frame by suitable bolts 128. The slide 125 is reciprocated by a lever 129 which has a slot at its upper end engaging a pin 130 carried by the slide. The lower end of the lever is adjustably attached to a rod 131. The connection between the lever and the rod may be adjusted and held in adjusted position by lock nuts 132. The rod 131 is connected to a yoke 133 which carries a roller running in a cam groove 134 in a disk on the main shaft 25.

When the chucks 112 and 113 are separated, the coated end is moved between the same by the rotation of the disk 7, after which the chuck 112 clamps the can end on to the chuck 113, and both chucks move downward slightly, which brings the can end into proper alinement with the curling roll. The curling roll is then moved forward, engaging the can end and curling the outer edge thereof. This curling of the can end is very important in the preparation of the end for stacking and for rolling into a double seam. It is essential the outer edge of the can end shall be rolled into substantially a semicircle, and when so rolled the ends may be stacked one on the other, and they will be held from wedging together in this nested position. In other words, the can ends practically rest on this curled edge. A can end may be readily separated from the stack by a separating plate which engaging the outer curved surface of the curled edge will be directed between two adjacent ends and separate the same. Furthermore, this curling of the ends, as above noted, facilitates the forming of the double seam in the seaming machine. This preliminary curl to the edge is the starting or initial curling which forms the double seam. It is essential, therefore, that this curled edge should be accurately and uniformly made on the ends.

As above noted, the chucks which support the end during the curling operation, are mounted to rotate about a fixed axis. That is to say, these can ends are mounted in fixed bearings, so that when the curling roll engages the can end it is clamped between the chuck and can support, which prevents any lateral bulging or deflection of the can end, and this chuck and can support are held in fixed bearings which prevent any lateral movement of the chuck and can support. The curling roll is mounted on a slide which is positively reciprocated, and, therefore, each can end will be provided with a curled edge, which is not only uniform throughout the entire circumference of the end, but the curled edges on all of the ends will be uniform.

The amount of curl given to the edge may be varied by adjusting the connection of the lever 129 with the rod 131. After the end is curled, the chucks separate and the feed disk is given another step movement, which brings the can end over the opening 135 and the end drops through the opening into a receiving chute or receptacle. This opening constitutes the discharge station for the can ends. The chucks are each rotated from the central shaft 9 by a sprocket chain engaging a sprocket wheel 136 on the upper end of the shaft, and which also engage each of the sprocket wheels 58 and 116 on the chuck spindles. This chain also runs in contact with an idler 137.

The operation of my device is thought to be obvious from the above description, wherein the operation at each station has been described in detail. The ends to be coated are placed in the stack at the feeding-in station A. These ends, one at a time, are withdrawn from the stack on to the feed table and are moved along the feed table by the intermittently rotating feed disk. The chucks at the coating station are separated when this disk is given a movement and this permits the can end to be conveyed between the chucks after which the shaft 77 is oscillated, which causes the end to be clamped, rotated and depressed into engagement with the coating roll, after which it is released, stripped from the chuck and ready to be carried to the next station. The next step movement of the feed disk 7 moves the can end from between the chucks and conveys the same between the chucks at the curling station and meanwhile another can end is carried by the feeding disk between the chucks of the coating station so that while one end is being coated the previously coated end is being curled. The can end now brought between the chucks at the curling station is clamped and rotated and the chucks are depressed, after which the curling roll is caused to contact with the edge of the can end and curl the same. At the finish of the curling operation the curling roll is withdrawn from contact with the end and the chucks separated. The stripper plate 110 also extends to the chucks of the curling station and is similarly shaped and located relative to the chucks so as to strip the can end from the upper chuck if the same should stick to the chuck. The can end which has been curled is then moved to the discharging station.

It is obvious that minor changes in the details of construction and arrangement of parts may be made without departing from the spirit of the invention as set forth in the appended claims.

Having thus described our invention, what we claim as new and desire to secure by Letters Patent is:—

1. An end coating machine including in combination upper and lower chucks rotating about a fixed axis, means for giving said chucks a relative movement toward and from each other to clamp and release a can end, a coating roll associated with said chucks, and means operating in timed relation to the movement of the chucks for placing a can end between the chucks, and for removing the same after it has been coated.

2. An end coating machine including in combination upper and lower chucks rotating about a fixed axis, means for giving said chucks a relative movement toward and from each other to clamp and release a can end, a coating roll adjacent said chucks, means for supplying said coating roll with a coating material, and means operating in timed relation to the movement of said chucks for placing a can end between the chucks and removing the same after it has been coated.

3. An end coating machine including in combination upper and lower chucks rotating about a fixed axis, means for giving said chucks a relative movement toward and from each other to clamp and release a can end, a coating roll, a shaft supporting said coating roll whereby the same rotates about a fixed axis, and means for supplying said coating roll with coating material, said coating roll being positioned adjacent said chucks whereby a movement of said chucks causes the can end clamped thereby to engage the coating roll.

4. An end coating machine including in combination upper and lower chucks rotating about a fixed axis, means for yieldingly supporting said lower chuck, means for moving said upper chuck for clamping a can end against the lower chuck and for moving the can end and lower chuck to cause the end to engage a coating roll, a coating roll, means for supporting said coating roll whereby the same may rotate about a fixed axis adjacent the chucks, and means for supplying said coating roll with coating material.

5. An end coating machine including in combination upper and lower chucks rotating about a fixed axis, means for yieldingly supporting said lower chuck, means for moving said upper chuck for clamping a can end against the lower chuck and for moving the can end and lower chuck to cause the end to engage a coating roll, a coating roll, a shaft for supporting said coating roll, a handing up roll for supplying the coating roll with coating material, means for rotating the handing up roll and coating roll, said coating roll being disposed adjacent said chucks.

6. An end coating machine including in combination upper and lower chucks rotating about a fixed axis, means for yieldingly supporting said lower chuck, means for moving said upper chuck for clamping a can end against the lower chuck and for moving the can end and lower chuck to cause the end to engage a coating roll, a tank for coating material adjacent said chucks, a handing up roll in said tank, a coating roll adapted to extend through a slot in the tank and coöperate with said handing up roll, and means for rotating the handing up roll and coating roll.

7. An end coating machine including in combination upper and lower chucks rotating about a fixed axis, means for yieldingly supporting said lower chuck, means for moving said upper chuck for clamping a can end against the lower chuck and for moving the can end and lower chuck to cause the end to engage a coating roll, a tank for coating material adjacent said chucks, a handing up roll in said tank, a coating roll adapted to extend through a slot in the tank and coöperate with said handing up roll, means for rotating the handing up roll and coating roll, and means for clearing the slot through which said coating roll projects.

8. An end coating machine including in combination a supporting table, a stack holder, means for withdrawing the ends to be coated one at a time from said stack holder and placing the same on said table, means for sliding the ends along said table to the coating station, said coating station including opposed rotating chucks, means for moving the chucks relative to each other to clamp the can end and release the same, and a coating roll associated with said chucks for engaging and coating the can end.

9. An end coating machine including in combination a supporting table, a stack holder, a coating station, a curling station, means for withdrawing the can ends one at a time from the stack and placing the same on said table, means for sliding the ends along the table first to the coating station and then to the curling station.

10. An end coating machine including in combination a supporting table, a stack holder, a coating station, a curling station, a rotatable disk having pockets therein for sliding the can ends on said table, and means for intermittently rotating said disk and positively holding the same at a dwell whereby the can ends are taken from the stack holder and presented first to the coating station and then to the curling station.

11. An end coating machine including in combination a supporting table, a stack holder mounted above said table, an oscillating arm having a suction cup for removing the can ends one at a time from the stack holder on to said table, a pair of chucks rotating about a fixed vertical axis, means for moving the chucks toward and from each other for clamping a can end, means for sliding the can ends along the table from the stack holder between the chucks when the chucks are separated and for subsequently removing the can ends from between the chucks after the ends are coated.

12. An end coating machine including in combination a supporting table, a stack holder mounted above said table, an oscillating arm having a suction cup for removing the can ends one at a time from the stack holder on to said table, a pair of chucks rotating about a fixed vertical axis, means for moving the chucks toward and from each other for clamping a can end, means for sliding the can ends along the table from the stack holder between the chucks when the chucks are separated and for subsequently removing the can ends from between the chucks after the ends are coated, and a stripper plate for stripping the can end from the chuck.

13. An end coating machine including in combination chucks rotating about a fixed axis, means for moving the upper chuck toward and from the lower chuck for clamping a can end and for depressing the lower chuck to cause the can end to engage the coating roll, a coating roll, means for supplying the coating roll with coating material, and a stripper for engaging the can end and stripping the same from the upper chuck when the said upper chuck is raised.

14. An end coating machine including in combination chucks rotating about a fixed axis, means for moving the upper chuck toward and from the lower chuck for clamping a can end and for depressing the lower chuck to cause the can end to engage the coating roll, a coating roll, means for supplying the coating roll with coating material, a stripper for engaging the can end and stripping the same from the upper chuck when the said upper chuck is raised, and means for placing a can end between the chucks when said chucks are separated and for removing the can end from between the chucks after the end has been coated.

15. An end coating machine including in combination, chucks rotating about a fixed axis, means for moving the upper chuck toward and from the lower chuck for clamping and releasing a can end, a coating roll associated with said chucks, a second pair of chucks rotating about a fixed axis, means for moving the upper chuck of said second pair relative to said lower chuck for clamping and releasing a can end, a curling roll associated with said second pair of chucks, and means for positively moving said curling roll into contact with the can end for curling the edge.

In testimony whereof, we affix our signatures in the presence of two witnesses.

DANIEL P. ROBINSON.
JOHN COYLE.

Witnesses:
  D. CINNAMOND,
  C. O. PORTER.

Copies of this patent may be obtained for five cents each, by addressing the "Commissioner of Patents, Washington, D. C."